US008995463B2

(12) United States Patent
Zhang et al.

(10) Patent No.: US 8,995,463 B2
(45) Date of Patent: Mar. 31, 2015

(54) METHOD, APPARATUS AND SYSTEM FOR OBTAINING KEY INFORMATION DURING FAST CHANNEL SWITCHING

(71) Applicant: Huawei Technologies Co., Ltd, Shenzhen (CN)

(72) Inventors: Yuanyuan Zhang, Nanjing (CN); Peiyu Yue, Nanjing (CN); Teng Shi, Nanjing (CN); Yonghui Tian, Nanjing (CN); Guangyuan Liu, Shenzhen (CN); Chuxiong Zhang, Nanjing (CN); Renzhou Zhang, Nanjing (CN); Weizhong Yuan, Shenzhen (CN); Lingyan Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 13/731,448

(22) Filed: Dec. 31, 2012

(65) Prior Publication Data

US 2013/0182557 A1    Jul. 18, 2013

Related U.S. Application Data

(63) Continuation of application No. PCT/CN2011/074826, filed on May 28, 2011.

(30) Foreign Application Priority Data

Jun. 30, 2010   (CN) .......................... 2010 1 0219161

(51) Int. Cl.
*H04J 15/00*       (2006.01)
*H04L 12/939*      (2013.01)
(Continued)

(52) U.S. Cl.
CPC ............ *H04L 49/55* (2013.01); *H04N 21/4384* (2013.01); *H04N 21/63345* (2013.01);
(Continued)

(58) Field of Classification Search
CPC .................. H04L 2012/56; H04L 2012/5617; H04W 74/002
USPC ......... 370/464, 465, 474, 498, 503, 509–512; 709/231, 232, 236
See application file for complete search history.

(56) References Cited

U.S. PATENT DOCUMENTS

| 7,430,222 B2 * | 9/2008 | Green et al. ................... 370/486 |
| 7,523,482 B2 * | 4/2009 | Barrett et al. .................. 725/120 |

(Continued)

FOREIGN PATENT DOCUMENTS

| CN | 101137043 | 3/2008 |
| CN | 101442663 | 5/2009 |

(Continued)

OTHER PUBLICATIONS

Lin, The Implementation of Fast Channel Switching in IPTV, IEEE, 2009, pp. 684-688.*

(Continued)

*Primary Examiner* — Dmitry H Levitan
(74) *Attorney, Agent, or Firm* — Staas & Halsey LLP

(57) ABSTRACT

Embodiments of the present invention disclose a method, apparatus and system for obtaining key information during fast channel switching. A fast channel switching request sent by a terminal is received; at least one data unit bearing key information is generated according to the fast channel switching request; a fast channel switching response message is sent to the terminal, where the response message carries an identifier of a first data unit bearing the key information and the number of data units bearing the key information; and the at least one data unit bearing the key information is sent to the terminal. When the key information is lost, the key information is retransmitted without a need to perform status maintenance, which improves scalability of fast channel switching.

6 Claims, 4 Drawing Sheets

(51) Int. Cl.

| | | |
|---|---|---|
| *H04N 21/438* | (2011.01) | |
| *H04N 21/6334* | (2011.01) | |
| *H04N 21/6405* | (2011.01) | |
| *H04N 21/6408* | (2011.01) | |
| *H04N 21/6437* | (2011.01) | |
| *H04L 29/06* | (2006.01) | |

(52) U.S. Cl.
CPC ....... *H04N21/6405* (2013.01); *H04N 21/6408* (2013.01); *H04N 21/6437* (2013.01); *H04L 65/4076* (2013.01); *H04L 65/4092* (2013.01); *H04L 65/608* (2013.01)
USPC ........................................................ 370/464

(56) References Cited

U.S. PATENT DOCUMENTS

| | | | | |
|---|---|---|---|---|
| 7,562,375 | B2* | 7/2009 | Barrett et al. | 725/38 |
| 8,218,654 | B2* | 7/2012 | Cheng et al. | 375/240.28 |
| 8,301,982 | B2* | 10/2012 | Ver Steeg et al. | 714/776 |
| 8,542,705 | B2* | 9/2013 | Johansson et al. | 370/473 |
| 8,731,152 | B2* | 5/2014 | Lee et al. | 379/93.21 |
| 2005/0190781 | A1 | 9/2005 | Green et al. | |
| 2007/0214490 | A1 | 9/2007 | Cheng et al. | |
| 2009/0165067 | A1* | 6/2009 | Bruckman et al. | 725/110 |
| 2011/0093883 | A1* | 4/2011 | Sun | 725/31 |
| 2011/0161517 | A1* | 6/2011 | Ferguson | 709/231 |
| 2012/0099588 | A1* | 4/2012 | Liu et al. | 370/389 |

FOREIGN PATENT DOCUMENTS

| | | |
|---|---|---|
| CN | 101742175 | 6/2010 |
| EP | 1670252 A2 | 6/2006 |
| EP | 2429238 A1 | 3/2012 |
| EP | 2509320 A1 | 10/2012 |
| JP | 2007-166409 | 6/2007 |
| WO | WO 2006/084503 A1 | 8/2006 |
| WO | WO 2008/156390 A1 | 12/2008 |

OTHER PUBLICATIONS

Rey, RFC 4588, Retransmission Payload Format, RFC, Jul. 2006, 29 pages.*
Ott, J. et al., *Extended RTP Profile for Real-time Transport Control Protocol (RTCP) -Based Feedback (RTP/AVPF)*, Network Working Group, Jul. 2006, pp. 1-51.
Yang, P. et al., *Preamble Acquisition of MPEG-TS Multicast Sessions*, Audio-Video Transport, Dec. 10, 2009, pp. 1-19.
International Search Report, dated Aug. 25, 2011, in corresponding International Application No. PCT/CN2011/074826 (6 pp.).
Form PCT/ISA/220, dated Aug. 25, 2011, in corresponding International Application No. PCT/CN2011/074826 (3 pp.).
Form PCT/ISA/237, dated Aug. 25, 2011, in corresponding International Application No. PCT/CN2011/074826 (5 pp.).
Extended European Search Report mailed Feb. 20, 2013 for corresponding European Application No. 11777256.6.
Written Opinion of the International Searching Authority mailed Aug. 25, 2011 for corresponding International Application No. PCT/CN2011/074826.
T. Einarsson et al., "Multiple aggregated control URIs for RTSP; draft-einarsson-mmusic-rtsp-macuri-01.txt", Dec. 21, 2006, XP015047576, ISSN: 0000-004, pp. 1-16.
B. VerSteeg et al., "Unicast-Based Rapid Acquisition of Multicast RTP Sessions; draft-ietf-avt-rapid-acquisition-for-rtp-01.txt", Internet Engineering Task Force, IETF, Standardworkingdraft, Internet Society (ISOC) 4, vol. avt, No. 1, Jun. 16, 2009, XP015062756, pp. 1-41.
A. Begen et al., "RTP Payload Format for MPEG2-TS Preamble; draft-begen-act-rtp-mpeg2ts-preamble-02.txt", Aug. 12, 2009, Internet Engineering Task Force (IETF), Standardworkingdraft, Internet Society (ISOC), XP015063827, pp. 1-39.
Jinghua Lin et al., "The Implementation of Fast Channel Switching in IPTV", Intelligent Computation Technology and Automation, 2009, ICICTA '09, Second International Conference on Intelligent Computation Technology and Automation, IEEE, Oct. 10, 2009, XP031547549, pp. 684-688, ISBN: 978-0-7695-3804-4.
Chinese Office Action mailed Mar. 22, 2013 for corresponding Chinese Application No. 201010219161.1.

* cited by examiner

METHOD, APPARATUS AND SYSTEM FOR OBTAINING KEY INFORMATION DURING FAST CHANNEL SWITCHING

CROSS-REFERENCE TO RELATED APPLICATIONS

This application is a continuation of International Application No. PCT/CN2011/074826, filed on May 28, 2011, which claims priority to Chinese Patent Application No. 201010219161.1, filed on Jun. 30, 2010, both of which are hereby incorporated by reference in their entireties.

FIELD OF THE INVENTION

The present invention relates to the communications field, and specifically, to a method, apparatus and system for obtaining key information during fast channel switching.

BACKGROUND OF THE INVENTION

Channel switching time is a critical factor affecting user experience. Therefore, fast channel switching becomes a focus concerned in the industry. The so-called fast channel switching refers to a shorter channel switching time than common channel switching time. The common channel switching time is generally required to be not longer than 2 seconds, whereas the fast channel switching time is generally required to be not longer than 1 second, and even not longer than 500 milliseconds.

There are many factors that affect the channel switching time, where a waiting delay of key information and an I frame is one critical factor that affects the channel switching time. The key information refers to configuration information required for initialization of a demultiplexer or a decoder. The key information may include, but is not limited to information such as a PAT (Program Association Table, program association table), a PMT (Program Map Table, program map table), a CAT (Conditional Access Table, conditional access table), a PCR (Program Clock Reference, program clock reference), an SPS (Sequence Parameter Set, sequence parameter set), a PPS (Picture Parameter Set, picture parameter set), and SEI (Supplemental Enhanced Information, supplemental enhanced information). If a medium is transmitted based on a TS (Transport Stream, transport stream), before demultiplexing, information such as the PAT, PMT, CAT and PCR is needed; if a medium is transmitted by using H.264 encoding, before decoding, information such as the SPS, PPS and SEI needs to be obtained. The I frame refers to an intra-frame prediction frame. The decoder starts decoding after receiving the I frame.

In the industry, a well-recognized method for implementing fast channel switching based on reducing the waiting delay of the key information and I frame is:

(1) A cache server is set in a network, and the cache server joins a multicast group, and receives and caches multicast data; (2) during channel switching, a terminal sends a fast channel switching request to the cache server, and the cache server selects an I frame closest to current time after receiving the request, and extracts key information; (3) the cache server sends the key information to the terminal through unicast, and then, starting from the I frame, sends the cached multicast data to the terminal through unicast; (4) at proper time, the terminal joins the multicast group and receives the multicast data. When the data received by the terminal through unicast and through multicast, respectively, is the same, the terminal instructs the cache server to stop sending the data.

The foregoing cache server is usually used as a retransmission server at the same time. During play of a channel, the terminal receives and plays the multicast data. The transport protocol used by multicast is UDP (User Datagram Protocol, user datagram protocol); and therefore the data may be lost. When detecting data loss, the terminal sends a retransmission request to the cache server. The cache server retransmits lost data to the terminal through unicast, performs status maintenance of the server, records the terminal sending the fast channel switching request, and maintains an individual channel switching data source for each terminal sending the fast channel switching request. After receiving the retransmission request from the terminal, the cache server determines whether the terminal is a fast channel switching terminal, and determines data to be retransmitted to the terminal. This needs the cache server to perform the status maintenance, which is sure to consume a lot of resources and cause a problem of poor scalability.

SUMMARY OF THE INVENTION

In view of the foregoing, the present invention provides a method, apparatus and system for obtaining key information during fast channel switching, solving a problem of poor scalability in fast channel switching.

In one aspect of the present invention, a method for obtaining key information during fast channel switching is provided. The method includes: receiving a fast channel switching request sent by a terminal; generating, according to the fast channel switching request, at least one data unit bearing the key information; sending a fast channel switching response message to the terminal, where the response message carries an identifier of a first data unit bearing the key information and the number of data units bearing the key information; and sending, to the terminal, the at least one data unit bearing the key information.

In another aspect of the present invention, a server is provided. The server includes: a receiving unit, configured to receive a fast channel switching request sent by a terminal; a generating unit, configured to generate, according to the fast channel switching request, at least one data unit bearing key information; a response sending unit, configured to send a fast channel switching response message to the terminal, where the response message carries an identifier of a first data unit bearing the key information and the number of data units bearing the key information; and a sending unit, configured to send, to the terminal, the at least one data unit bearing the key information.

In still another aspect of the present invention, a system for obtaining key information during fast channel switching is provided. The system includes a server. The server includes: a receiving unit, configured to receive a fast channel switching request sent by a terminal; a generating unit, configured to generate, according to the fast channel switching request, at least one data unit bearing key the information; a response sending unit, configured to send a fast channel switching response message to the terminal, wherein the response message carries an identifier of a first data unit bearing the key information and the number of data units bearing the key infonnation; and a sending unit, configured to send, to the terminal, the at least one data unit bearing the key information; a terminal, configured to send a fast channel switching request to the server, and receive a fast channel switching response message sent by the server, where the response message carries an identifier of a first data unit bearing key information and the number of data units bearing the key information; and receive the at least one data unit that bears the key information and is sent by the server.

When the key information is lost, according to the technical solutions provided in the present invention, the key information may be retransmitted, without a need to perform status maintenance, which improves the scalability of fast channel switching.

DETAILED DESCRIPTION OF THE EMBODIMENTS

In order to make persons skilled in the art better understand content of the present invention, the present invention is illustrated in detail below with reference to accompanying drawings and specific embodiments.

Figure 1:
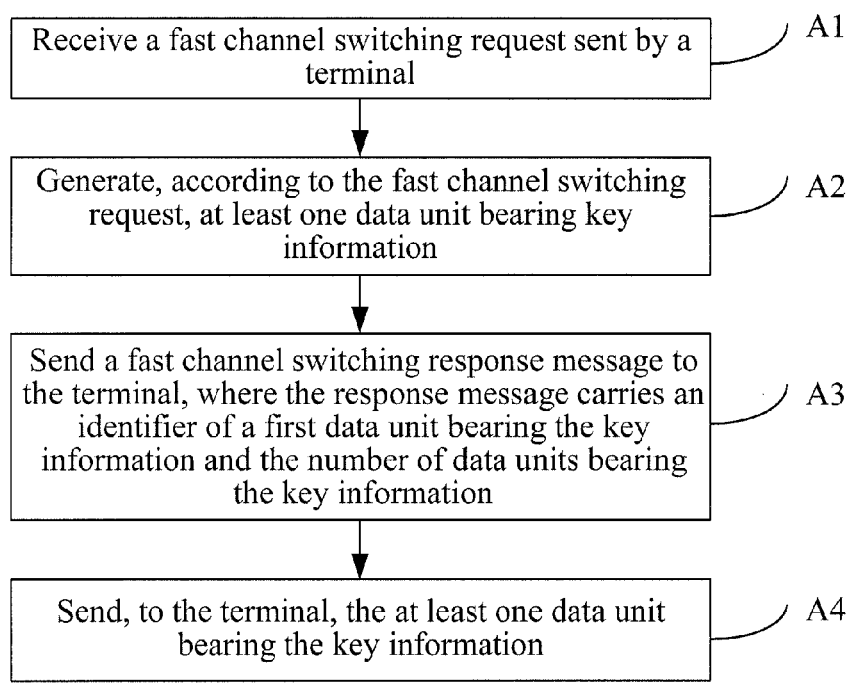
FIG. 1 is a basic flow chart of a method for obtaining key information during fast channel switching according to an embodiment of the present invention.

Reference may be made to FIG. 1 for a basic process of a method for obtaining key information during fast channel switching, which mainly includes the following steps:

A1. Receive a fast channel switching request sent by a terminal.

The terminal sends a fast channel switching request to a retransmission server, where the fast channel switching request here is an RTCP (Real-time Transport Control Protocol, real-time transport control protocol) RAMS-R (Rapid Acquisition of Multicast Sessions-Request, rapid acquisition of multicast sessions-request) message. The RAMS-R message includes at least an SSRC (Synchronization Source, synchronization source) of the terminal, an SSRC of a media source, buffer capacity of the terminal (unit: millisecond), and a maximum receive bit rate of the terminal (unit: bit/s).

A2. Generate, according to the fast channel switching request, at least one data unit bearing key information.

The data unit here includes at least three cases, where the specific cases are as follows:

1. The retransmission server collects key information scattered in multiple RTP packets, and generates n RTP packet, where n≥1. A unicast RTP packet bearing the key information uses a different SSRC from an RTP unicast pulse packet, that is, different from the SSRC of the media source. An I frame is selected as start of a pulse according to the SSRC of the media source provided in the RAMS-R message and current time, and end time of the pulse is calculated according to the buffer capacity of the terminal and the maximum receive bit rate of the terminal that are provided in the RAMS-R message. All the RTP packets received from a multicast group and cached during the time from the start of the I frame to the end time of the pulse constitute an RTP unicast pulse. Therefore, sequence number space of the unicast RTP packet bearing the key information is independent of sequence number space of the RTP unicast pulse packet. The retransmission server randomly selects a sequence number from sequence number space corresponding to the SSRC of the unicast RTP packet bearing the key information, and uses the selected sequence number as a sequence number of a first unicast RTP packet bearing the key information. Sequence numbers of the remaining unicast RTP packets bearing the key information are increased progressively by 1.

2. The retransmission server collects key information scattered in multiple RTP packets, and generates n RTCP RAMS-KI (RAMS-Key Information, RAMS-key information) message, where n≥1. An RAMS-KI message includes a sequence number and type of the RAMS-KI message. Sequence numbers of the RAMS-KI messages may start from 0, with a progressive increase by 1.

3. The retransmission server collects key information scattered in multiple RTP packets, and generates n RTP packet, where n≥1. Assume that a sequence number of a first RTP packet in an RTP unicast pulse is m, a sequence number of the foregoing n unicast RTP packet bearing the key information starts from m-n, with a progressive increase by 1. An SSRC is the same as that of an RTP packet in the RTP unicast pulse, where both are the SSRC of the media source.

A3. Send a fast channel switching response message to the terminal, where the response message carries an identifier of a first data unit bearing the key information and the number of data units bearing the key information.

In an embodiment, the fast channel switching response message is an RAMS-I (RAMS-Information, RAMS message) message, specifically including information such as the sequence number of the first unicast RTP packet bearing the key information, the number of unicast RTP packets bearing the key information, the sequence number of the first RTP unicast pulse packet, the earliest time when the terminal joins the multicast, lasting time of the RTP unicast pulse, and a maximum transmit bit rate of the retransmission server.

A4. Send, to the terminal, the at least one data unit bearing the key information.

The retransmission server sends, to the terminal, the at least one data unit bearing the key information, and then sends the RTP unicast pulse to the terminal.

Here the method further includes: determining, by the terminal, according to the identifier of the first data unit bearing the key information and the number of the data units bearing the key information, determining a retransmission request to be sent after that the data unit bearing the key information is lost.

As regards the first case in step A2, the retransmission request includes an SSRC of an RTP packet lost on the terminal, a load type of the RTP packet lost on the terminal and a sequence number of the RTP packet lost on the terminal.

As regards the second case in step A2, the retransmission request includes a sequence number of an RAMS-KI message that bears the key information and is lost on the terminal.

As regards the third case in step A2, the retransmission request includes the SSRC of the terminal, the SSRC of the media source, a load type of a lost RTP packet, a sequence number of the lost RTP packet, and the number of packets continuously lost after the RTP packet specified by the sequence number.

After receiving the retransmission request, the retransmission server sends, to a client, corresponding content that needs to be retransmitted.

Figure 2:
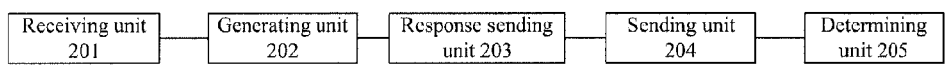
FIG. 2 is a basic block diagram of a server according to an embodiment of the present invention.

Reference may be made to FIG. 2 for a basic block diagram of a server according to an embodiment of the present invention, where the server mainly includes:

a receiving unit 201, configured to receive a fast channel switching request sent by a terminal, where the terminal sends the fast channel switching request to the retransmission server, where the fast channel switching request is an RTCP (Real-time Transport Control Protocol, real-time transport control protocol) RAMS-R (RAMS-Request, RAMS-request) message. The RAMS-R message includes at least an SSRC (Synchronization Source, synchronization source) of the terminal, an SSRC of a media source, buffer capacity of the terminal (unit: millisecond), and a maximum receive bit rate of the terminal (unit: bit/s);

a generating unit 202, configured to generate, according to the fast channel switching request, at least one data unit bearing key information; the data unit here includes at least three cases, where the specific cases are as follows:

1. The retransmission server collects key information scattered in multiple RTP packets, and generates n RTP packet, where n≥1. A unicast RTP packet bearing the key information uses a different SSRC from an RTP unicast pulse packet, that is, different from the SSRC of the media source. The retransmission server randomly selects a sequence number from sequence number space corresponding to the SSRC of the unicast RTP packet bearing the key information, and uses the selected sequence number as a sequence number of a first unicast RTP packet bearing the key information. Sequence numbers of the remaining unicast RTP packets bearing the key information are increased progressively by 1;

2. The retransmission server collects key information scattered in multiple RTP packets, and generates n RTCP RAMS-KI message, where n≥1. An RAMS-KI message includes a sequence number and type of the RAMS-KI message. Sequence numbers of RAMS-KI messages may start from 0, with a progressive increase by 1;

3. The retransmission server collects key information scattered in multiple RTP packets, and generates n RTP packet, n≥1. Assume that a sequence number of a first RTP packet in an RTP unicast pulse is m, a sequence number of the foregoing n unicast RTP packet bearing the key information starts from m-n, with a progressive increase by 1. An SSRC is the same as that of an RTP packet in the RTP unicast pulse, where both are the SSRC of the media source;

a response sending unit 203, configured to send a fast channel switching response message to the terminal, where the response message carries an identifier of a first data unit bearing the key information and the number of data units bearing the key information; the fast channel switching response message is an RAMS-I (RAMS-Information, RAMS message) message, specifically including information such as a sequence number of a first unicast RTP packet bearing the key information, the number of unicast RTP packets bearing the key information, a sequence number of a first RTP unicast pulse packet, the earliest time when the terminal joins multicast, lasting time of the RTP unicast pulse, and a maximum transmit bit rate of the retransmission server; and a sending unit 204, configured to send, to the terminal, the at least one data unit bearing the key information; the retransmission server sends, to the terminal, the at least one data unit bearing the key information.

The server further includes a determining unit 205, configured to, when receiving a terminal request, determine whether the key information has changed during a procedure from reception of a previous terminal request to the reception of this terminal request; if not changed, directly send, to the terminal, at least one data unit that bears the key information and is generated upon receiving the previous terminal request; and if changed, regenerate at least one data unit bearing the changed key information, and send the regenerated at least one data unit to the terminal.

The receiving unit 201 is further configured to receive a data retransmission request sent by the terminal, where the retransmission request includes an SSRC, load type and sequence number of an RTP packet lost on the terminal, or the retransmission request includes a sequence number of an RTCP message that bears the key information and is lost on the terminal.

The sending unit 204 is further configured to send, to the terminal according to the retransmission request, the at least one data unit bearing the key information.

Figure 3:
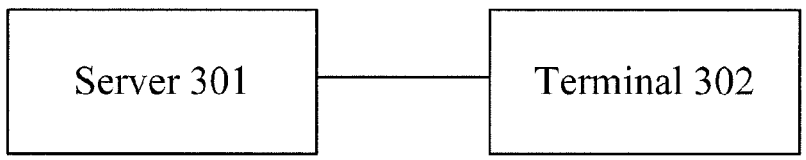
FIG. 3 is a basic block diagram of a system for obtaining key information during fast channel switching according to an embodiment of the present invention.

Reference may be made to FIG. 3 for a basic block diagram of a system for obtaining key information during fast channel switching according to an embodiment of the present invention, where the system mainly includes:

a server 301, whose composition structure and function have been described in the first embodiment, which are not repeatedly described here; and a terminal 302, configured to send a fast channel switching request to the server 301, and receive a fast channel switching response message sent by the server 301, where the response message carries an identifier of a first data unit bearing key information and the number of data units bearing the key information; and receive the at least one data unit that bears the key information and is sent by the server 301.

Figure 4:
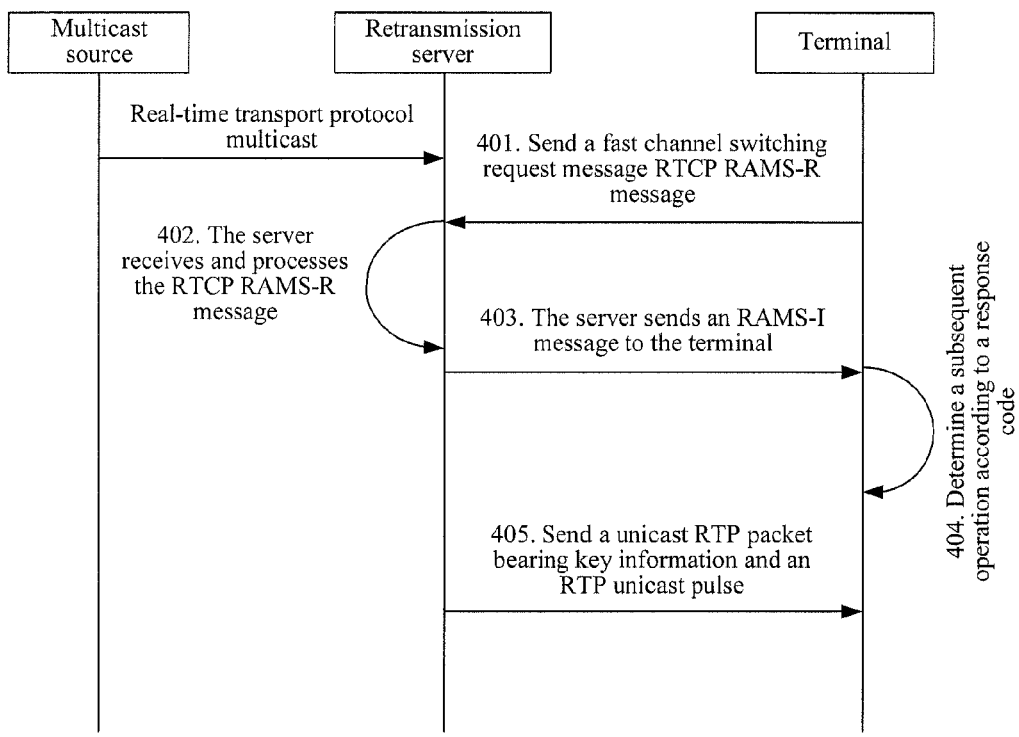
FIG. 4 is a specific implementation flow chart of a method for obtaining key information during fast channel switching according to an embodiment of the present invention.

Reference may be made to FIG. 4 for a specific implementation flow chart of a method for obtaining key information during fast channel switching according to an embodiment of the present invention, which specifically is:

A retransmission server joins a multicast group, and the retransmission server receives and caches multicast data. During fast channel switching, the method for obtaining the key information is as follows:

401. A terminal sends an RTCP RAMS-R message to a retransmission server, that is, sends a fast channel switching request message, where the RTCP RAMS-R message includes information such as an SSRC (Synchronization Source, synchronization source) of the terminal, an SSRC of a media source, buffer capacity of the terminal (unit: millisecond), and a maximum receive bit rate of the terminal (unit: bit/s).

402. The retransmission server receives and processes the RTCP RAMS-R message; a unicast RIP packet bearing the key information and an RTP unicast pulse are generated if the retransmission server accepts the request.

The method for the retransmission server to generate the RTP unicast pulse is as follows: Select an I frame as start of the pulse according to the SSRC of the media source provided in the RAMS-R message and the current time, and calculate end time of the pulse according to the buffer capacity of the terminal and the maximum receive bit rate of the terminal that are provided in the RAMS-R message. In this way, all RTP packets received from a multicast group and cached during the period from the start of the I frame to the end time of the pulse constitute the RTP unicast pulse.

The method for the retransmission server to generate the unicast RTP packet bearing the key information is as follows:

The retransmission server collects key information carried in multiple RTP packets, and generates n RTP packet, n≥1. A unicast RTP packet bearing the key information uses a different SSRC from an RTP unicast pulse packet, that is, the unicast RTP packet bearing the key information uses a different SSRC from the SSRC of the media source. Therefore, sequence number space of the unicast RTP packet bearing the key information is independent of sequence number space of the RTP unicast pulse packet. The retransmission server randomly selects a sequence number from sequence number space corresponding to the SSRC of the unicast RTP packet bearing the key information, and uses the selected sequence number as the sequence number of a first unicast RTP packet bearing the key information. Sequence numbers of the remaining unicast RTP packets bearing the key information are increased progressively by 1.

403. The retransmission server sends an RAMS-I message to the terminal, that is, sends a fast channel switching response message. The RAMS-I message includes a response code. For example, the response code being 2xx indicates that the retransmission server accepts the request message sent by the terminal and the terminal needs to prepare to receive the RTP unicast; the response code being 5xx indicates that the request message sent by the terminal cannot be accepted due to a reason of the retransmission server, and the terminal needs to join the multicast. When the retransmission server accepts the request message sent by the terminal, the RAMS-I message further includes the SSRC of the unicast RTP packet bearing the key information, the sequence number of the first unicast RTP packet bearing the key information, the number of unicast RTP packets bearing the key information, the SSRC of the media source, and the sequence number of the first RTP unicast pulse packet; the RAMS-I message may further include information such as the earliest time when the terminal joins the multicast, lasting time of the RTP unicast pulse, and a maximum transmit bit rate of the retransmission server.

404. After receiving the RAMS-I message, the terminal determines a subsequent operation according to the response code; and executes the following step if the response code is 2xx.

405. The terminal receives the unicast RTP packet bearing the key information and the RTP unicast pulse that are sent by the retransmission server. The RTP unicast pulse is used to bear a media stream.

It should be noted that before obtaining the key information, the terminal needs to first obtain, in an outband manner, the SSRC of the media source and the SSRC of the unicast RTP packet bearing the key information. For example, the terminal may obtain the foregoing two SSRCs from SDP (Session Description Protocol, session description protocol).

The terminal may determine, according to the SSRC of the unicast RTP packet bearing the key information, the unicast RTP packet bearing the key information; and then determine, according to the sequence number of the first unicast RTP packet bearing the key information and the number of unicast RTP packets bearing the key information that are included in the RAMS-I message, a lost data unit bearing the key information in the unicast RTP packet. A sequence number of the lost data unit bearing the key information and an SSRC of the lost data unit bearing the key information may be used as unique identification information of the lost data unit bearing the key information.

The unique identification information of the lost data unit bearing the key information may be understood as a sequence number of a unicast RTP packet bearing the key information and an SSRC of the unicast RTP packet bearing the key information.

It should be further noted that when a terminal 1 detects that an RTP packet bearing the key information is lost, the method further includes:

The terminal sends an RTCP NACK (Negative Acknowledgement, negative acknowledgement) message, that is, a retransmission request message, to the retransmission server. The retransmission request message carries the identification information of the lost data unit; the retransmission request message includes at least: synchronization source information of the terminal, SSRC information of the unicast RTP packet bearing the key information, the sequence number of the lost real-time transport protocol packet bearing the key information, and the number of packets continuously lost after the real-time transport protocol packet with the specified sequence number. According to this embodiment, the unicast RTP packet bearing the key information and a unicast RTP packet of the media source have different SSRCs, and therefore, the retransmission server determines, according to the unique identification information carried in the RTCP NACK message, the RTP packet lost on the terminal, without a need to perform status maintenance.

The terminal receives a unicast RTP packet bearing the key information from the retransmission server; where the unicast RTP packet bearing the key information is the lost data unit which is requested, by the terminal through the retransmission request, to be sent by the retransmission server.

It should be further noted that the key information does not change frequently, and therefore the method for the retransmission server to generate the unicast RTP packet bearing the key information may be further optimized:

After the retransmission server receives a fast channel switching request message sent by the terminal 1 and generates at least one unicast RTP packet bearing the key information, if the retransmission server receives another fast channel switching request message sent by another terminal, the method further includes:

determining, by the retransmission server, whether the key information of a current channel has changed, where the current channel refers to a channel corresponding to the SSRC of the media source carried in the fast channel switching request, for example, the retransmission server may determine, according to version information of the key information, whether the key information of the current channel has changed;

if the retransmission server determines that the key information of the current channel has not changed, sending, to the current terminal, the cached at least one data unit bearing the key information, where it should be noted that the current terminal sending the fast channel switching request message may be the terminal 1 or another terminal; and if the retransmission server determines that the key information of the current channel has changed, regenerating at least one data unit bearing the current key information, and sending it to the current terminal.

Figure 5:
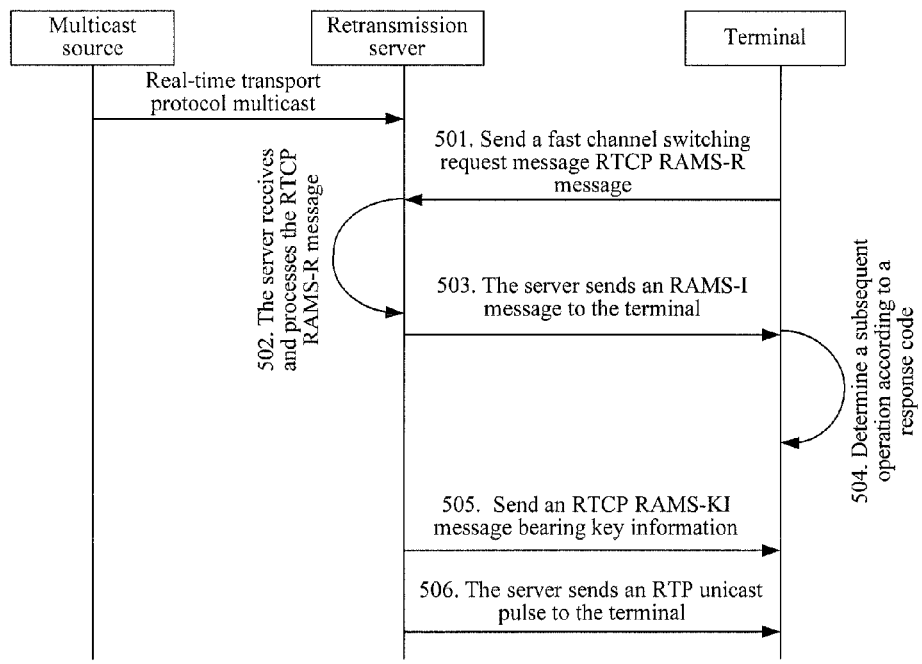
FIG. 5 is a specific implementation flow chart of another method for obtaining key information during fast channel switching according to an embodiment of the present invention.

Reference may be made to FIG. 5 for a specific implementation flow chart of a method for obtaining key information during fast channel switching according to an embodiment of the present invention, which is specifically as follows:

A retransmission server joins a multicast group, and the retransmission server receives and caches multicast data. During fast channel switching, the method for obtaining the key information is as follows:

501: A terminal sends an RTCP RAMS-R message to a retransmission server, that is, sends a fast channel switching request message, where the RTCP RAMS-R message includes information such as an SSRC of the terminal, an SSRC of a media source, buffer capacity of the terminal (unit: millisecond), and a maximum receive bit rate of the terminal (unit: bit/s).

502. The retransmission server receives and processes the RTCP RAMS-R message; an RTCP RAMS-KI message bearing the key information and an RTP unicast pulse are generated if the retransmission server accepts the request.

The method for the retransmission server to generate the RTP unicast pulse is: Select an I frame as start of the pulse according to the SSRC of the media source provided in the RAMS-R message and the current time, and calculate end time of the pulse according to the buffer capacity of the terminal and the maximum receive bit rate of the terminal that are provided in the RAMS-R message. All RTP packets received from a multicast group and cached during the period from the start of the I frame to the end time of the pulse constitute the RTP unicast pulse.

The method for the retransmission server to generate the RTCP RAMS-KI message bearing the key information is as follows:

The retransmission server collects key information carried in multiple RTP packets, and generates n RTCP RAMS-KI message, n≥1. The RTCP RAMS-KI message includes a sequence number and type of the RTCP RAMS-KI message. The sequence number of the RTCP RAMS-KI message may start from 0, or may start from a randomly selected positive integer, with a progressive increase by 1. The type is used to indicate a type of the borne key information such as, a PAT, a PMT, a CAT, a PCR, an SPS, a PPS, and an SEI.

503. The retransmission server sends an RAMS-I message to the terminal, that is, sends a fast channel switching response message. The RAMS-I message includes a response code. For example, the response code being 2xx indicates that the retransmission server accepts the request message sent by the terminal and the terminal needs to prepare to receive the RTP unicast; the response code being 5xx indicates that the request message sent by the terminal cannot be accepted due to a reason of the retransmission server, and the terminal needs to join the multicast. When the retransmission server accepts the request message sent by the terminal, the RAMS-I message further includes information such as a sequence number of a first RTCP RAMS-KI message bearing the key information, the number of RTCP RAMS-KI messages, and a sequence number of a first RTP packet. If the RAMS-I message does not include the sequence number of the first RTCP RAMS-KI message bearing the key information, it is defaulted that the sequence number of the first RTCP RAMS-KI message bearing the key information is 0. The RAMS-I message may further include information such as the earliest time when the terminal joins the multicast, lasting time of the RTP unicast pulse, and a maximum transmit bit rate of the retransmission server.

504. After receiving the RAMS-I message, the terminal determines a subsequent operation according to the response code; and executes the following step if the response code is 2xx.

505. The terminal receives the RTCP RAMS-KI message sent by the retransmission server.

It should be noted that, when the response code is 2xx, that is, in a status that the retransmission server accepts the request message sent by the terminal, the RAMS-I message and the RTCP RAMS-KI message may constitute an RTCP combined packet and are sent together to the terminal.

506. The retransmission server sends the RTP unicast pulse to the terminal.

It should be further noted that the key information does not change frequently, and therefore the method for the retransmission server to generate the unicast RTP packet bearing the key information may be further optimized:

When the retransmission server receives a fast channel switching request message sent by a terminal 1 and generates at least one RTCP RAMS-KI message bearing the key information, the retransmission server caches the generated at least one data unit bearing the key information; if the retransmission server receives another fast channel switching request message sent by another terminal, the method further includes:

determining, by the retransmission server, whether the key information of a current channel has changed;

if the retransmissions server determines that the key information of the current channel has not changed, sending, to the current terminal, the cached at least one data unit bearing the key information, that is, sending, to the current terminal, the cached at least one RTCP RAMS-KI message bearing the key information, where it should be noted that the current terminal sending the fast channel switching request message may be the terminal 1 or another terminal; and if the retransmission server determines that the key information of the current channel has changed, generating at least one data unit bearing the current key information, and sending the data unit to the current terminal, where the data unit is an RTCP RAMS-KI message.

It should be further noted that the terminal may determine, according to the sequence number of the first RTCP RAMS-KI message bearing the key information and the number of RTCP RAMSI KI messages that are included in the RAMS-I message, a lost data unit bearing the key information, that is, determine a lost RTCP RAMS-KI message bearing the key information. The sequence number of the RTCP RAMS-KI message bearing the key information may be used as unique identification information of the lost RTCP RAMS-KI message bearing the key information.

Figure 6:
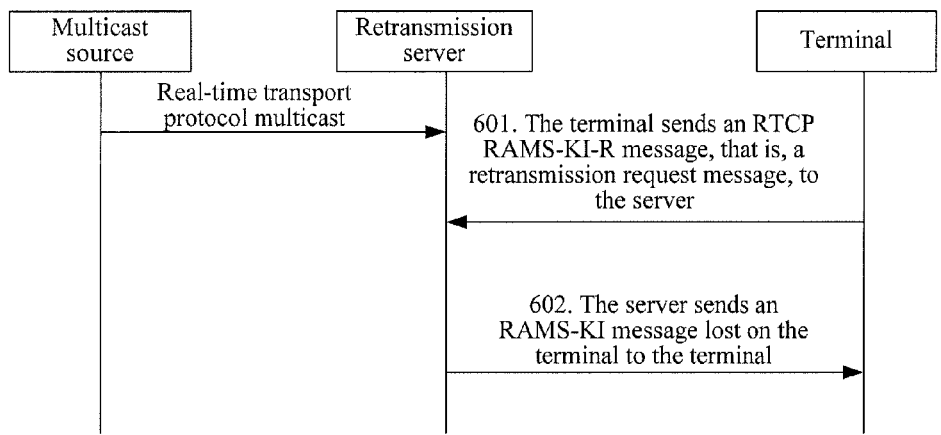
FIG. 6 is a specific implementation flow chart of another method for obtaining key information during fast channel switching according to an embodiment of the present invention.

It should be further noted that if the terminal determines, according to the sequence number of the first RTCP RAMS-KI message bearing the key information and the number of RTCP RAMSI-KI messages that are provided in the RAMS-I message, that the RTCP RAMS-KI message is lost, that is, the key information is lost, the method for the terminal to obtain the lost key information again may be as shown in FIG. 6. Specific implementation steps are as follows:

601. The terminal sends an RTCP RAMS-KI-R (RAMS-Key Information-Request, rapid acquisition of multicast sessions-key information-request) message, that is, a retransmission request message for obtaining the lost key information again, to the retransmission server; where the RTCP RAMS-KI-R message includes the unique identification information of the lost RCTP RAMS-KI message.

602. After receiving the RAMS-KI-R message, the retransmission server sends the lost RAMS-KI message to the terminal according to the unique identification information of the lost RTCP RAMS-KI message, where the unique identification information is provided in the RAMS-KI-R message.

The unique identification information of the lost data unit bearing the key information, that is, the unique identification information of the lost RTCP RAMS-KI message, includes, but is not limited to the following forms or their combination: a sequence number of a first lost RTCP RAMS-KI message and the number of RTCP RAMS-KI messages continuously lost after the RTCP RAMS-KI message with the specified sequence number; a sequence number of a lost RTCP RAMS-KI message; and a type of a lost RTCP RAMS-KI message.

Figure 7:
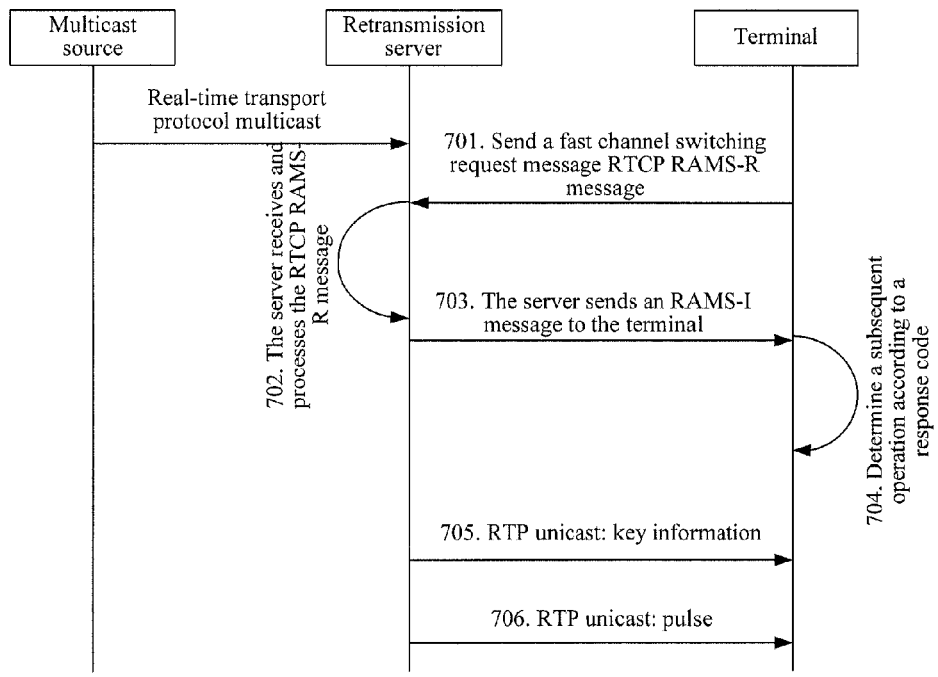
FIG. 7 is a specific implementation flow chart of a method for obtaining key information during fast channel switching according to an embodiment of the present invention.

Reference may be made to FIG. 7 for a specific implementation flow chart of a method for obtaining key information during fast channel switching according to an embodiment of the present invention, where the method specifically is:

A retransmission server joins a multicast group, and the retransmission server receives and caches multicast data. During fast channel switching, the method for obtaining the key information is as follows:

701: A terminal sends an RTCP RAMS-R message to a retransmission server, that is, sends a fast channel switching request message, where the RTCP RAMS-R message includes information such as an SSRC of the terminal, an SSRC of a media source, buffer capacity of the terminal (unit: millisecond), and a maximum receive bit rate of the terminal (unit: bit/s).

702. The retransmission server receives and processes the RTCP RAMS-R message; a unicast RTP packet bearing the key information and an RTP unicast pulse are generated if the retransmission server accepts the request.

The method for the retransmission server to generate the RTP unicast pulse is as follows: Select an I frame as start of the pulse according to the SSRC of the media source provided in the RAMS-R message and the current time, and calculate end time of the pulse according to the buffer capacity of the terminal and the maximum receive bit rate of the terminal that are provided in the RAMS-R message. All RTP packets received from the multicast group and cached during the period from the start of the I frame to the end time of the pulse constitute the RTP unicast pulse.

The method for the retransmission server to generate the unicast RTP packet bearing the key information is as follows:

The retransmission server collects key information carried in multiple RTP packets, and generates n RTP packet, n≥1. Assume that a sequence number of a first RTP packet in the RTP unicast pulse is m, a sequence number of the foregoing n unicast RTP packet bearing the key information starts from m-n, with a progressive increase by 1. An SSRC is the same as that of an RTP packet in the RTP unicast pulse, that is, both are the SSRC of the media source.

703. The retransmission server sends an RAMS-I message to the terminal, that is, sends a fast channel switching response message. The RAMS-I message includes a response code. For example, the response code being 2xx indicates that the retransmission server accepts the request message sent by the terminal and the terminal needs to prepare to receive the RTP unicast; the response code being 5xx indicates that the request message sent by the terminal cannot be accepted due to a reason of the retransmission server, and the terminal needs to join the multicast. When the retransmission server accepts the request message sent by the terminal, the RAMS-I message further includes the sequence number of the first unicast RTP packet bearing the key information and the number of unicast RTP packets bearing the key information; the RAMS-I message may further include information such as the earliest time when the terminal joins the multicast, lasting time of the RTP unicast pulse, a maximum transmit bit rate of the retransmission server.

704. After receiving the RAMS-I message, the terminal determines a subsequent operation according to the response code; and performs the following step if the response code is 2xx.

705. The terminal receives the unicast RTP packet bearing the key information and the RTP unicast pulse that are sent by the retransmission server.

It should be noted that the terminal may determine, according to the sequence number of the first unicast RTP packet bearing the key information, the number of unicast RTP packets bearing the key information, and load format information of the unicast RTP packet bearing the key information that are included in the RAMS-I message, a lost data unit bearing the key information. The SSRC of the media source, a sequence number of the lost data unit bearing the key information, and load format information of the data unit may constitute unique identification information of the lost data unit bearing the key information.

Figure 8:
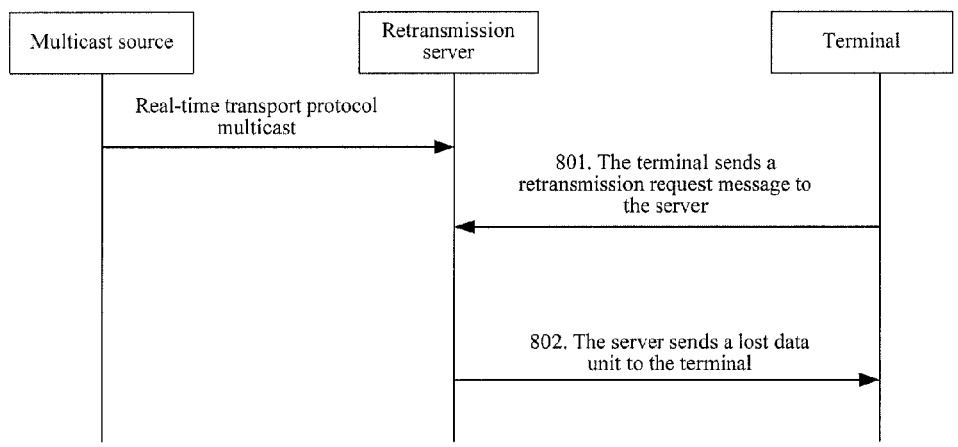
FIG. 8 is a specific implementation flow chart of a method for obtaining key information during fast channel switching according to an embodiment of the present invention.

It should be further noted that when a terminal 1 detects that a data unit bearing the key information is lost, the method for the terminal to obtain the lost data unit may be as shown in FIG. 8. A specific implementation procedure is as follows:

801. The terminal sends an RTCP NACK message to the retransmission server, that is, sends a retransmission request message; where the RTCP NACK message includes: synchronization source information of the terminal, synchronization source information of the media source, the load format information of a lost real-time transport protocol packet bearing the key information, the sequence number of the lost real-time transport protocol packet bearing the key information, and the number of real-time transport protocol packets continuously lost after the real-time transport protocol packet with the specified sequence number.

It should be noted that the RTCP NACK message includes a load format of the lost RTP packet, and therefore, the retransmission server can uniquely determine the RTP packet lost on the terminal, without a need to perform status maintenance. After determining the RTP packet lost on the terminal, the retransmission server retransmits the RTP packet through unicast.

802. The terminal receives the unicast RTP packet bearing the key information from the retransmission server; where the unicast RTP packet bearing the key information is the lost data unit which is requested, by the terminal through the retransmission request, to be sent by the retransmission server.

Persons of ordinary skill in the art may understand that all or part of the steps of the methods in the foregoing embodiments may be implemented by a program instructing relevant hardware. The program may be stored in a computer readable storage medium. The storage medium may include: a ROM, a RAM, a magnetic disk, a compact disk, and so on. In different embodiments, different operations and/or similar processing described here may be performed by dedicated hardware, and/or may not be performed by one or more general processors.

The foregoing describes the method, system, and apparatus for limiting a call of a calling user provided in the embodiments of the present invention. The principle and implementation manners of the present invention are elaborated with specific examples in the specification. The illustration of the foregoing embodiments is merely used to help in understanding the method and a core idea of the present invention. Meanwhile, persons of ordinary skill in the art may make variations to the specific implementation manners and application range of the present invention according to the thought of the present invention. In conclusion, the content of the specification should not be understood as a limitation to the present invention.

What is claimed is:

1. A method for fast channel switching, comprising:
receiving, by a retransmission server, fast channel switching request sent by a terminal comprising a demultiplexer or a decoder;

generating, according to the fast channel switching request, at least one Real-time Transport Protocol/Real-time Transport Control Protocol (RTP/RTCP) packet bearing key information or at least one RTP/RTCP unicast pulse packet bearing frame content, wherein the key information is configuration information for initialization of the terminal; and using a synchronization source (SSRC) in RTP/RTCP unicast pulse packets to differentiate RTP/RTCP packets from RTP/RTCP unicast pulse packets, wherein the SSRC in the RTP/RTCP unicast pulse packets is different from a SSRC in the RTP/RTCP packets;

sending a fast channel switching response message to the terminal, wherein the response message carries a sequence number of a first RTP/RTCP packet, number of RTP/RTCP packets and a sequence number of a RTP/RTCP unicast pulse packet; and receiving a retransmission request sent from the terminal, when the terminal determines that one or more RTP/RTCP packets are lost, based on at least the first RTP/RTCP packet and the number of RTP/RTCP packets, the retransmission request comprises at least the SSRC of the first RTP/RTCP packet for the lost RTP/RTCP packets, a load type of the lost RTP/RTCP packets and sequence number(s) of the lost RTP/RTCP packets;

sending, to the terminal, the lost RTP/RTCP packets, which lost RTP/RTCP packets are determined based on the SSRC of the RTP/RTCP packets determined from the SSRC of the first RTP/RTCP packet for the lost RTP/RTCP packets that differ from the SSRC of the RTP/RTCP unicast pulse packets and the received sequence number(s) of the lost RTP/RTCP packets.

2. The method according to claim 1, further comprising:

when receiving a request from a second terminal, determining whether the key information sent to the second terminal, has changed;

if the key information is not changed, directly sending, to the second terminal, the at least one RTP/RTCP packet that bears the key information and is generated upon receiving the second terminal request; and if the key information is changed, regenerating at least one RTP/RTCP packet bearing the changed key information, and sending the regenerated at least one RTP/RTCP packet to the second terminal.

3. A retransmission server, comprising:

a receiving unit, configured to receive a fast channel switching request sent by a terminal comprising a demultiplexer or a decoder;

a generating unit, configured to generate, according to the fast channel switching request, at least one Real-time Transport Protocol/Real-time Transport Control Protocol (RTP/RTCP) packet bearing key information or at least one RTP/RTCP unicast pulse packet bearing frame content, wherein the key information is configuration information for initialization of the terminal and a synchronization source (SSRC) in RTP/RTCP unicast pulse packets is used to differentiate RTP/RTCP packets from RTP/RTCP unicast pulse packets, the SSRC in the RTP/RTCP unicast pulse packets being different from a SSRC in the RTP/RTCP packets;

a response sending unit, configured to send a fast channel switching response message to the terminal, wherein the response message carries a sequence number of a first RTP/RTCP packet, number of RTP/RTCP packets and a sequence number of a RTP/RTCP unicast pulse packet;

the receiving unit, configured to receive a retransmission request sent from the terminal, when the terminal determines that one or more RTP/RTCP packets are lost, based on at least the first RTP/RTCP packet and the number of RTP/RTCP packets, the retransmission request comprises at least the SSRC of the first RTP/RTCP packet for the lost RTP/RTCP packets, a load type of the lost RTP/RTCP packets and sequence number(s) of the lost RTP/RTCP packets; and a sending unit, configured to send, to the terminal, the lost RTP/RTCP packets, which lost RTP/RTCP packets are determined based on the SSRC of the RTP/RTCP packets determined from the SSRC of the first RTP/RTCP packet for the lost RTP/RTCP packets that differ from the SSRC of the RTP/RTCP unicast pulse packets and the received sequence number(s) of the lost RTP/RTCP packets.

4. The server according to claim 3, further comprising:

a determining unit, configured to, when receiving a second terminal request, determine whether the key information sent to the second terminal, has changed; if the key information is not changed, directly send, to the second terminal, the at least one RTP/RTCP packet that bears the key information and is generated upon receiving the second terminal request; and if the key information is changed, regenerate at least one RTP/RTCP packet bearing the changed key information, and send the regenerated at least one RTP/RTCP packets to the second terminal.

5. A system for fast channel switching, comprising:

a retransmission server capable of communication with a terminal comprising a demultiplexer or a decoder, the retransmission server includes:

a receiving unit, configured to receive a fast channel switching request sent by the terminal;

a generating unit, configured to generate, according to the fast channel switching request, at least one Real-time Transport Protocol/Real-time Transport Control Protocol (RTP/RTCP) packet bearing key information or at least one RTP/RTCP unicast pulse packet bearing frame content, wherein the key information is configuration information for initialization of the terminal and a synchronization source (SSRC) in the RTP/RTCP unicast pulse packets is used to differentiate RTP/RTCP packets from RTP/RTCP unicast pulse packets, the SSRC in the RTP/RTCP unicast pulse packets being different from a SSRC in the RTP/RTCP packets, a response sending unit, configured to send a fast channel switching response message to the terminal, wherein the response message carries a sequence number of a first RTP/RTCP packet, number of RTP/RTCP packets and a sequence number of a RTP unicast pulse packet, the receiving unit, configured to receive a retransmission request sent from the terminal, when the terminal determines that one or more RTP/RTCP packets are lost, based on at least the first RTP/RTCP packet and the number of RTP/RTCP packets, the retransmission request comprises at least the SSRC of the first RTP/RTCP packet, a load type of the lost RTP/RTCP packets and sequence number(s) of the lost RTP/RTCP packets, and a sending unit, configured to send, to the terminal, the lost RTP/RTCP packets, which lost RTP/RTCP packets are determined based on the SSRC of the RTP/RTCP packets determined from the SSRC of the first RTP/RTCP packet for the lost RTP/RTCP packets that differ from the SSRC of the RTP/RTCP unicast pulse packets and the received sequence number(s) of the lost RTP/RTCP packets; and the terminal, configured to send a fast channel switching request to the retransmission server, and receive a fast channel switching response message sent by the retransmission server, where the response message carries a sequence number of the first RTP/RTCP packet bearing key information and the number of RTP/RTCP packets; and configured to receive the at least one RTP/RTCP packets that bears the key information and sent by the retransmission server.

6. The system according to claim 5, further comprising:

when the retransmission server receives a fast channel switching request sent by other terminal, determine whether the key information sent to the other terminal has changed; if the key information is not changed, directly send the at least one RTP/RTCP packet that bears the key information and is generated upon receiving the other terminal request to the other terminal; and if the key information is changed, regenerate at least one RTP/RTCP packet bearing the changed key information, and send the regenerated at least one RTP/RTCP packets to the other terminal.

\* \* \* \* \*